A. HUFFMAN.
TRACTION WHEEL.
APPLICATION FILED NOV. 1, 1912.
1,077,076.
Patented Oct. 28, 1913.
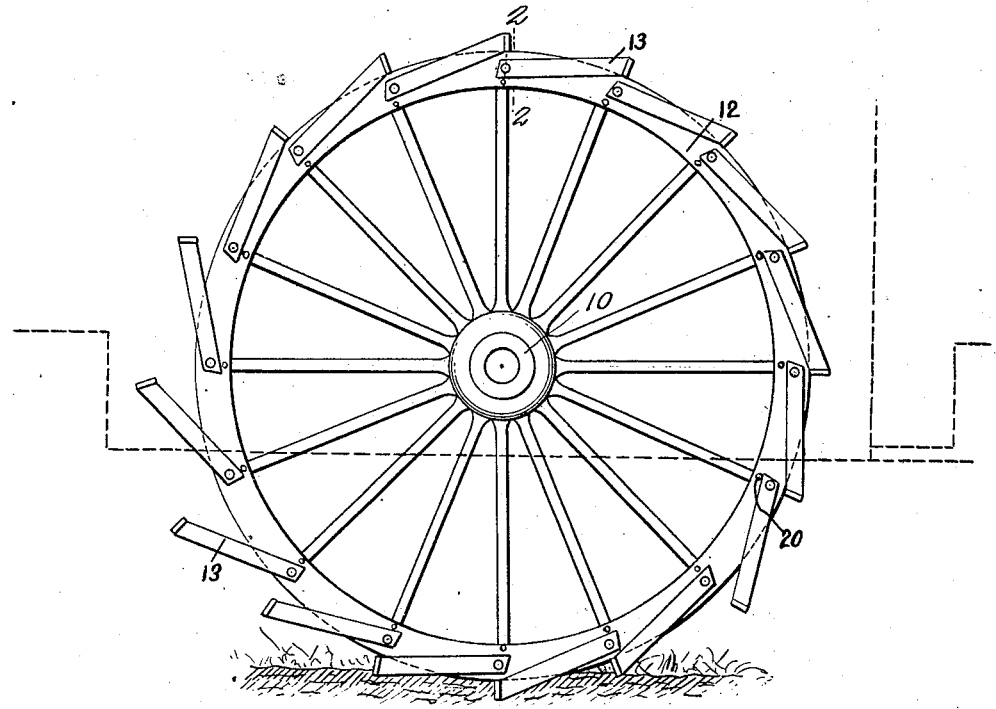
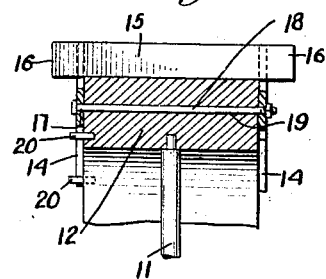
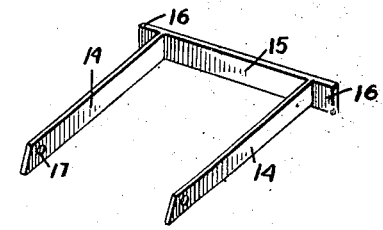
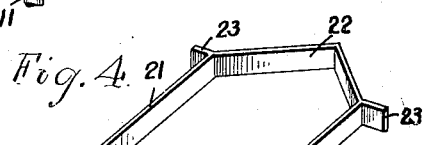
WITNESSES
INVENTOR
Alonzo Huffman
BY
ATTORNEYS

UNITED STATES PATENT OFFICE.

ALONZO HUFFMAN, OF MUTUAL, OKLAHOMA.

TRACTION-WHEEL.

1,077,076.

Specification of Letters Patent.   Patented Oct. 28, 1913.

Application filed November 1, 1912.  Serial No. 728,988.

*To all whom it may concern:*

Be it known that I, ALONZO HUFFMAN, a citizen of the United States, and a resident of Mutual, in the county of Woodward and State of Oklahoma, have invented a new and Improved Traction-Wheel, of which the following is a full, clear, and exact description.

This invention relates to traction wheels for use with agricultural implements, traction engines and for like purposes, and has reference more particularly to a traction wheel having a rim and a plurality of ground-engaging members associated therewith and adapted gravitationally to assume projected positions in advance or back of the point of contact between the wheel and the ground.

The object of the invention is to provide a simple and efficient traction wheel which can be used with traction engines, agricultural implements, and for other analogous purposes, the tractive efficiency of which is materially greater than that of the ordinary traction wheel, which cannot readily slip in soft or wet ground when turning in either a backward or a forward direction, which is strong and compact in form and cannot readily be injured, and in which the parts when injured can be easily replaced.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a side elevation of a traction wheel constituting an embodiment of my invention; Fig. 2 is an enlarged, transverse section on the line 2—2 of Fig. 1; Fig. 3 is a perspective view showing one of the ground-engaging members separated from the wheel; and Fig. 4 is a similar view showing a ground-engaging member of modified form.

Before proceeding to a more detailed explanation of my invention it should be understood that while the device is particularly useful in connection with agricultural implements adapted for use in sandy, soft or moist soil, it can also be advantageously employed for other purposes to which traction wheels are usually put. The ground-engaging members may be of different form, size and proportions, or may vary in number, provided that they are of such character that they will automatically, gravitationally assume positions in advance or back of the point of contact between the wheel and the ground, so that they will engage the ground at points remote from the said point of contact, thereby materially augmenting the tractive efficiency of the wheel.

Certain of the details of construction shown for example herewith, form no part of the invention and can be varied in accordance with individual preference and special conditions, without departing from the underlying spirit of the invention.

Referring more particularly to the drawings, I have shown for example a wheel having a hub 10, spokes 11, and a rim or felly 12, these parts all being fashioned from any suitable materials, and of customary form. Arranged about the rim of the wheel is a plurality of ground-engaging members 13. Each of these, in the preferred embodiment of the invention, consists of a U-shaped element having sides 14 and a cross-bar 15, the ends 16 of which project laterally beyond the sides 14. The latter have, near the free extremities, openings 17 adapted to receive a bolt 18. The bolt is disposed in a suitably proportioned and located transverse opening 19 of the rim, and constitutes means for pivotally mounting the ground-engaging member upon the wheel. The sides 14 of the member are spaced apart a distance such that the wheel rim can be received therebetween, fitting closely, though permitting the ground-engaging member to swing freely. The wheel rim, adjacent to each of the ground-engaging members, has laterally extending lugs or stops 20, which limit the pivotal movement of the ground-engaging members in one direction, that is, outwardly from the wheel. The inward movement of the ground-engaging members is limited by the contact of the cross-bars 15 with the periphery of the wheel rim.

In Fig. 4 I have shown a modified form of the ground-engaging members, in which I provide sides 21 similar to the sides 14. The cross-bar 22 however, has the portion intermediate the sides 21, V-shaped, the ends 23 projecting beyond the sides as in the other embodiment of the invention. For certain characters of work the V-shaped cross-bars give better tractive effort.

It will be seen that as the wheel rolls upon the ground, moving in a forward direction, the ground-engaging members as they approach the ground at the front of the wheel, arrange themselves gravitationally in projected positions, so that each will come in contact with the ground a considerable distance in advance of the point of contact between the wheel and the ground, thereby obviously giving a better tractive effort. It will be readily understood that if a traction wheel has contact with the ground at a plurality of points, the tractive effort will be materially greater than where the point of contact is a single one. Similarly, if the wheel is moving backward, the ground-engaging members dispose themselves at the back of the wheel, in projected position, so that they will come in contact with the ground at points materially at the rear of the point of contact between the wheel and the ground.

The member 13 may have the edge portions coming in contact with the ground sharpened so as to increase the gripping action of same with the ground.

Having thus described my invention, I claim as new and desire to secure by Letters Patent:

1. A traction wheel having a rim, and a plurality of independent, movable, ground-engaging members pivotally mounted upon said rim at the sides thereof, and extending across the same, said members at the lower part of the wheel gravitationally assuming projected positions and at the upper part of the wheel lying closely against the rim thereof.

2. A traction wheel having a rim, and a plurality of independent, movable, ground-engaging members associated therewith, each of said members consisting of a U-shaped element having sides and a cross-bar, said sides being pivotally secured at the sides of said rim, whereby said cross-bar extends across said rim.

3. A traction wheel having a rim, and a plurality of independent, movable, ground-engaging members associated therewith, each of said members consisting of a U-shaped element having sides and a cross-bar, said sides being pivotally secured at the sides of said rim, whereby said cross-bar extends across the rim, said cross-bar having the ends extended laterally beyond said sides, said rim being provided with stops limiting the movements of said ground-engaging members.

In witness whereof I have signed my name to this specification in the presence of two subscribing witnesses.

ALONZO HUFFMAN.

Witnesses:
 WILLIE C. RIGGS,
 NINA L. FOSTER.